US008965823B2

(12) United States Patent
Sohn et al.

(10) Patent No.: US 8,965,823 B2
(45) Date of Patent: Feb. 24, 2015

(54) INSIDER THREAT DETECTION DEVICE AND METHOD

(75) Inventors: Seon Gyoung Sohn, Daejeon (KR); Chi Yoon Jeong, Daejeon (KR); Dong Ho Kang, Daejeon (KR); Jung Chan Na, Daejeon (KR); Ik Kyun Kim, Daejeon (KR); Hyun Sook Cho, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 251 days.

(21) Appl. No.: 13/475,880

(22) Filed: May 18, 2012

(65) Prior Publication Data

US 2013/0091085 A1 Apr. 11, 2013

(30) Foreign Application Priority Data

Oct. 11, 2011 (KR) ........................ 10-2011-0103671

(51) Int. Cl.

| | |
|---|---|
| ***G06F 17/00*** | (2006.01) |
| ***G06N 5/02*** | (2006.01) |
| ***G08B 31/00*** | (2006.01) |

(52) U.S. Cl.

CPC ...................................... *G08B 31/00* (2013.01)
USPC ............................................................ 706/46

(58) Field of Classification Search

USPC ............................................................ 706/46
See application file for complete search history.

(56) References Cited

U.S. PATENT DOCUMENTS

| | | | | |
|---|---|---|---|---|
| 7,902,977 | B2 * | 3/2011 | Howe | 340/541 |
| 8,014,310 | B2 * | 9/2011 | Chang et al. | 370/252 |
| 8,019,865 | B2 * | 9/2011 | Chang et al. | 709/224 |
| 8,051,283 | B2 * | 11/2011 | Lee et al. | 713/150 |
| 8,095,973 | B2 * | 1/2012 | Kim et al. | 726/13 |
| 8,140,671 | B2 * | 3/2012 | Jeong et al. | 709/224 |
| 8,166,545 | B2 * | 4/2012 | Kim et al. | 726/23 |
| 8,200,690 | B2 * | 6/2012 | Paknad et al. | 707/768 |
| 8,225,107 | B2 * | 7/2012 | Chang et al. | 713/189 |
| 8,230,503 | B2 * | 7/2012 | Kim et al. | 726/22 |
| 8,307,441 | B2 * | 11/2012 | Kim et al. | 726/23 |
| 8,341,721 | B2 * | 12/2012 | Kim et al. | 726/12 |
| 8,775,613 | B2 * | 7/2014 | Chang et al. | 709/224 |
| 8,799,291 | B2 * | 8/2014 | Lee et al. | 707/741 |
| 8,812,867 | B2 * | 8/2014 | Jho et al. | 713/189 |
| 2010/0169971 | A1 | 7/2010 | Raviv | |

OTHER PUBLICATIONS

Unsupervised segmentation of heel-strike IMU data using rapid cluster estimation of wavelet features, Yuwono, M.; Su, S.W.; Moulton, B.D.; Nguyen, H.T. Engineering in Medicine and Biology Society (EMBC), 2013 35th Annual International Conference of the IEEE DOI: 10.1109/EMBC.2013.6609660 Publication Year: 2013, pp. 953-956.*

(Continued)

*Primary Examiner* — Michael B Holmes

(57) ABSTRACT

The present invention relates to an insider threat detection device and method which collects and analyzes a variety of information generated by insiders working for an organization, such as behaviors, events, and states of the insider, and detects an abnormal insider who may become a potential threat. According to the present invention, the insider threat detection method and apparatus analyzes information related to insiders using the correlation analysis method, and previously detects an abnormal sign of an insider who may become a potential threat to an organization, which makes it possible to protect the organization from attacks on systems inside the organization or seizure of important information inside the organization.

9 Claims, 2 Drawing Sheets

(56) References Cited

OTHER PUBLICATIONS

Detecting Anomalous Insiders in Collaborative Information Systems, You Chen; Nyemba, S.; Malin, B. Dependable and Secure Computing, IEEE Transactions on vol. 9, Issue: 3 DOI: 10.1109/TDSC.2012.11 Publication Year: 2012, pp. 332-344.*

Trojan Detection Based on Network Flow Clustering, Xiaochen Zhang; Shengli Liu; Lei Meng; Yunfang Shi Multimedia Information Networking and Security (MINES), 2012 Fourth International Conference on DOI: 10.1109/MINES.2012.242 Publication Year: 2012, pp. 947-950.*

Analysis of Features Selection and Machine Learning Classifier in Android Malware Detection, Mas'ud, M.Z.; Sahib, S.; Abdollah, M.F.; Selamat, S.R.; Yusof, R. Information Science and Applications (ICISA), 2014 International Conference on DOI: 10.1109/ICISA.2014.6847364 Publication Year: 2014, pp. 1-5.*

Michael Kirkpatrick et al., "An Architecture for Contextual Insider Threat Detection", 2009, pp. 1-11.

* cited by examiner

INSIDER THREAT DETECTION DEVICE AND METHOD

CROSS-REFERENCE TO RELATED APPLICATIONS

This application claims priority to and the benefit of Korean Patent Application No. 10-2011-0103671 filed in the Korean Intellectual Property Office on Oct. 11, 2011, the entire contents of which are incorporated herein by reference.

TECHNICAL FIELD

The present invention relates to a device and method for detecting an abnormal insider who may become a potential threat, by collecting and analyzing a variety of information generated by insiders working for an organization, such as behaviors, events, and states of the insiders.

BACKGROUND ART

Currently, insider threat problems tend to increase in many organizations. A threat by an insider who well knows the internal structure of an organization may cause a more serious result than an attack from outside.

Recently, various security technologies have been developed. However, since most of security technologies have been developed to prevent attacks from outside, they have limitations in dealing with abnormal behaviors of insiders.

SUMMARY OF THE INVENTION

The present invention has been made in an effort to provide a device and method which collects information including behaviors of insiders working for an organization, various events related to the insiders, and states of the insiders, stores the collected information in a knowledge base, extracts patterns for the respective insiders from the stored information, and performs space-time correlation analysis with patterns of other insiders, thereby detecting an abnormal insider exhibiting a suspicious behavior pattern.

An exemplary embodiment of the present invention provides an insider threat detection device, including: an information collection unit to collect information related to insiders and convert the collected information into a normalized format; a knowledge base to store the information converted by the information collection unit; a pattern extraction unit to generate patterns of the respective insiders from the information stored in the knowledge base; and a correlation analysis unit to compare the patterns of the respective insiders, generated by the pattern extraction unit, and detect an abnormal insider.

The information collection unit may collect information including behaviors of the insiders, events related to the insiders, and state information of the insiders, convert the collected information into a normalized format, and store the converted information in the knowledge base.

The information collection unit may collect information related to the insiders, including building access records, host connection records, important document access and output records, mobile storage medium use records, asset take-out records, dangerous site connection records, database connection records of the insiders, and network traffic of information technology (IT) equipments owned by the insiders, convert the collected information into a normalized format including a 4W1H (who, when, where, what, and how) paradigm, and store the converted information in the knowledge base.

The pattern extraction unit may separate the information stored in the knowledge base into a higher frequency and a lower frequency than a predetermined reference value through wavelet transform, and then analyze the frequency of abnormal conditions for each insider at the higher frequency.

The correlation analysis unit may measure the similarity between patterns of the abnormal conditions for the respective insiders, generated by the pattern extraction unit, using an Euclidean distance, cluster insiders exhibiting a similar behavior pattern using the measured similarity, find out a cluster to which an insider having a different position belongs, to which an insider performing a different duty belongs, or to which only a small number of insiders belong, and then detect a suspicious abnormal insider.

Another exemplary embodiment of the present invention provides an insider threat detection method, including: collecting information related to insiders; converting the collected information into a normalized format; storing the converted information in a knowledge base; forming patterns for the respective insiders from the information stored in the knowledge base; and comparing the patterns for the respective insiders and detecting an abnormal insider.

The collecting of the information may include collecting behaviors of the insiders, events related to the insiders, and state information of the insiders.

The collecting of the information may include collecting information related to the insiders, including building access records, host connection records, important document access and output records, mobile storage medium use records, asset take-out records, dangerous site connection records, database connection records of the insiders, and network traffic of IT equipments owned by the insiders.

The converting of the collected information may include converting the collected information into a normalized format including a 4W1H (who, when, where, what, and how) paradigm.

The forming of the patterns may include separating the information stored in the knowledge base into a higher frequency and a lower frequency than a predetermined reference value through wavelet transform and analyzing the frequency of abnormal conditions for each insider at the higher frequency.

The comparing of the patterns may include measuring the similarity between the patterns of the abnormal conditions for the respective insiders, generated in the forming of the patterns, using an Euclidean distance, clustering insiders exhibiting a similar behavior pattern using the measured similarity, finding out a cluster to which an insider having a different position belongs, to which an insider performing a different duty belongs, or to which only a small number of insiders belong, and detecting an abnormal insider.

According to exemplary embodiments of the present invention, the insider threat detection method and apparatus analyzes information related to insiders using the correlation analysis method, and previously detects an abnormal sign of an insider who may become a potential threat to an organization, which makes it possible to protect the organization from attacks on systems inside the organization or seizure of important information inside the organization.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
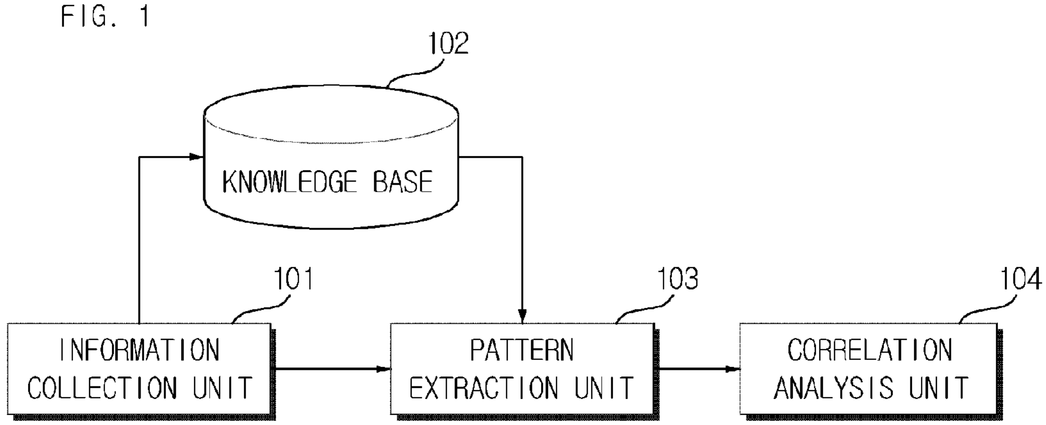
FIG. 1 illustrates an insider threat detection device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an insider threat detection device and method according to exemplary embodiments of the present invention will be described with reference to the accompanying drawings.

First, an insider threat detection device according to an exemplary embodiment of the present invention will be described with reference to FIG. 1.

FIG. 1 illustrates the insider threat detection device according to the exemplary embodiment of the present invention.

As illustrated in FIG. 1, the insider threat detection device according to the exemplary embodiment of the present invention includes an information collection unit 101, a knowledge base 102, a pattern extraction unit 103, and a correlation analysis unit 104. The information collection unit 101 is configured to collect information related to insiders and convert the collected information into a normalized format. The knowledge base 102 is configured to store the information converted by the information collection unit 101. The pattern extraction unit 103 is configured to generate patterns for the respective insiders from the information stored in the knowledge base 102. The correlation analysis unit 104 is configured to compare the patterns for the respective insiders, generated by the pattern extraction unit 103, and detect an abnormal insider.

The respective components of the insider threat detection device according to the exemplary embodiment of the present invention will be described in detail as follows.

The information collection unit 101 collects information including behaviors of the insiders, events related to the insiders, and state information of the insiders, converts the collected information into a normalized format, and stores the converted information in the knowledge base 102.

Examples of the information collected by the information collection unit 101 may include building access records, host connection records, important document access and output records, mobile storage medium use records, asset take-out records, dangerous site connection records, database connection records of the insiders, and network traffic of information technology (IT) equipments owned by the insiders. The above-described information is associated with the insiders.

The information collection unit 101 collects the above-described information related to the insiders, and converts the collected information into a normalized format such as a 4W1H (who, when, where, what, and how) paradigm, and then stores the converted information in the knowledge base 102.

The pattern extraction unit 103 separates the information stored in the knowledge base 102 into a higher frequency and a lower frequency than a predetermined reference value through wavelet transform, and then analyzes the frequency of abnormal conditions for each insider at the high frequency. Here, the higher frequency separated by the pattern extraction unit 103 indicates a short-term development of information, and the lower frequency indicates a long-term development of information. That is, the pattern extraction unit 103 analyzes the frequency of abnormal conditions for each insider at the higher frequency indicating a short-term development in the separated information.

The correlation analysis unit 104 measures the similarity between patterns of the abnormal conditions for the respective insiders, generated by the pattern extraction unit 103, using an Euclidean distance, clusters insiders exhibiting a similar behavior pattern using the measured similarity, finds out a cluster to which an insider having a different position belongs, to which an insider performing a different duty belongs, or to which only a small number of insiders belong, and then detects a suspicious abnormal insider. The similarity which the correlation analysis unit 104 measures using the Euclidean distance ($D(V_1, V_2)=\|V_1-V_2\|^2$) has a value ranging from 0 to 1. As the similarity approaches zero, the similarity between patterns increases.

Hereinafter, referring to FIG. 2, an insider threat detection method according to another exemplary embodiment of the present invention will be described.

Figure 2:
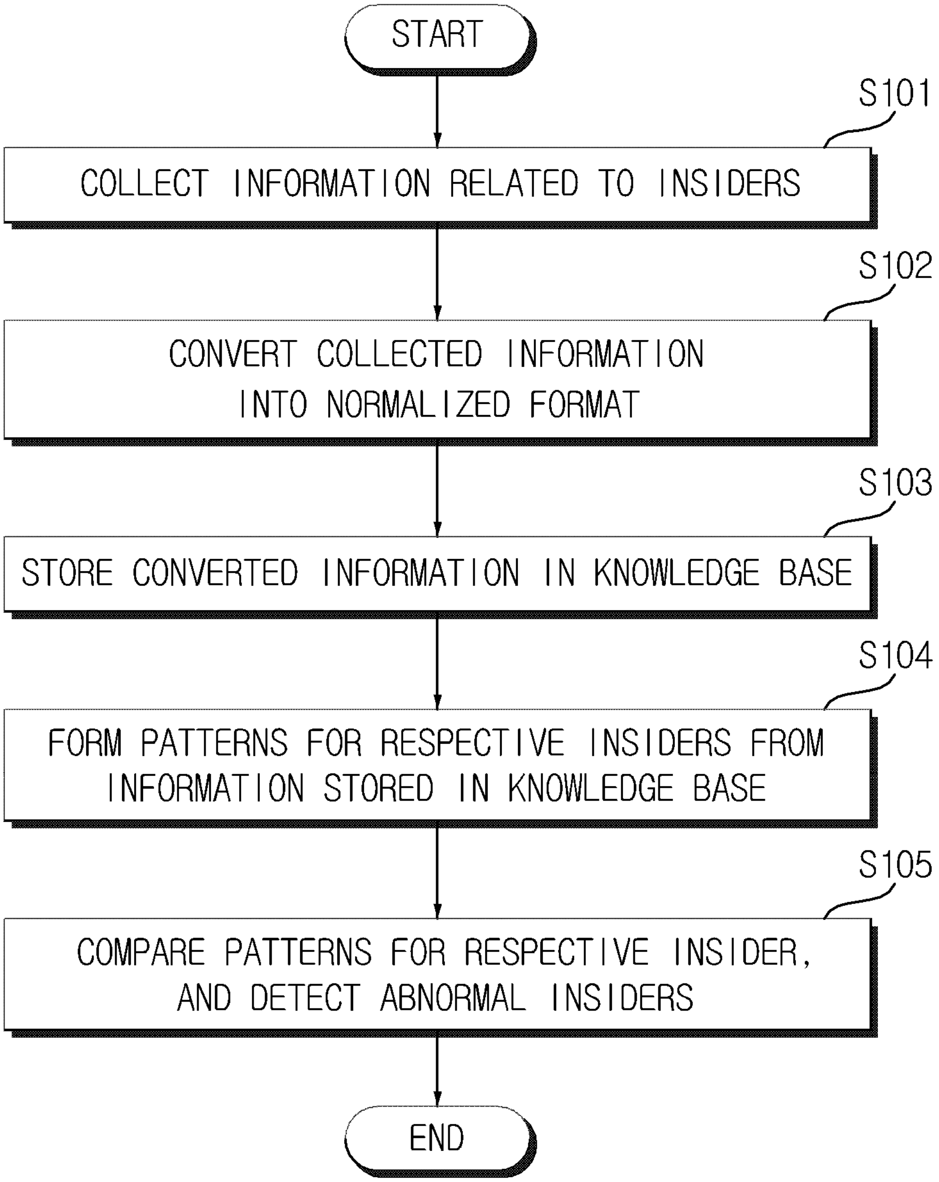
FIG. 2 shows an insider threat detection method according to another exemplary embodiment of the present invention.

FIG. 2 shows steps of the insider threat detection method according to the exemplary embodiment of the present invention.

First, the information collection unit 101 collects information related to insiders, including behaviors of the insiders, events related to the insiders, and state information of the insiders (S101).

Examples of the information collected by the information collection unit 101 may include building access records, host connection records, important document access and output records, mobile storage medium use records, asset take-out records, dangerous site connection records, database connection records of the insiders, and network traffic of IT equipments owned by the insiders.

Then, the information collection unit 101 converts the collected information related to the insiders into a normalized format, such as a 4W1H (who, when, where, what, and how) paradigm, and then stores the converted information in the knowledge base 102 (S102 and S103).

Then, the pattern extraction unit 103 forms patterns for the respective insiders from the information stored in the knowledge base 102 (S104). More specifically, the pattern extraction unit 103 separates the information stored in the knowledge base 102 into a higher frequency and a lower frequency than a predetermined reference value through wavelet transform, and then analyzes the frequency of abnormal conditions for each insider at the higher frequency. At this time, the higher frequency separated by the pattern extraction unit 103 indicates a short-term development of information, and the lower frequency indicates a long-term development of information. That is, the pattern extraction unit 103 analyzes the frequency of abnormal conditions for each insider at the high frequency indicating a short-term development in the separated information.

Then, the correlation analysis unit 104 compares the patterns for the respective patterns, and detects an abnormal insider (S105). More specifically, the correlation analysis unit 104 measures the similarity between patterns of the abnormal conditions for the respective insiders, generated by the pattern extraction unit 103, using an Euclidean distance, clusters insiders exhibiting a similar behavior pattern using the measured similarity, finds out a cluster to which an insider having a different position belongs, to which an insider performing a different duty belongs, or to which only a small number of insiders belong, and then detects a suspicious abnormal insider. The similarity which the correlation analysis unit 104 measures using the Euclidean distance ($D(V_1, V_2)=\|V_1-V_2\|^2$) has a value ranging from 0 to 1. As the similarity approaches zero, the similarity between patterns increases.

According to exemplary embodiments of the present invention, the insider threat detection method and apparatus analyzes information related to insiders using the correlation analysis method, and previously detects an abnormal sign of an insider who may become a potential threat to an organization, which makes it possible to protect the organization from attacks on systems inside the organization or seizure of important information inside the organization.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An insider threat detection device, comprising:

an information collection unit to collect information related to insiders and convert the collected information into a normalized format;

a knowledge base to store the information converted by the information collection unit;

a pattern extraction unit to generate patterns of the respective insiders from the information stored in the knowledge base; and a correlation analysis unit to compare the patterns of the respective insiders, generated by the pattern extraction unit, and detect an abnormal insider, wherein the information collection unit collects information including behaviors of the insiders, events related to the insiders, and state information of the insiders, converts the collected information into a normalized format, and stores the converted information in the knowledge base.

2. The insider threat detection device of claim 1, wherein the information collection unit collects information related to the insiders, including building access records, host connection records, important document access and output records, mobile storage medium use records, asset take-out records, dangerous site connection records, database connection records of the insiders, and network traffic of information technology (IT) equipments owned by the insiders, converts the collected information into a normalized format including a 4W1H (who, when, where, what, and how) paradigm, and stores the converted information in the knowledge base.

3. The insider threat detection device of claim 1, wherein the pattern extraction unit separates the information stored in the knowledge base into a higher frequency and a lower frequency than a predetermined reference value through wavelet transform, and then analyzes the frequency of abnormal conditions for each insider at the higher frequency.

4. The insider threat detection device of claim 3, wherein the correlation analysis unit measures the similarity between patterns of the abnormal conditions for the respective insiders, generated by the pattern extraction unit, using an Euclidean distance, clusters insiders exhibiting a similar behavior pattern using the measured similarity, finds out a cluster to which an insider having a different position belongs, to which an insider performing a different duty belongs, or to which only a small number of insiders belong, and then detects a suspicious abnormal insider.

5. An insider threat detection method, comprising:

collecting information related to insiders;

converting the collected information into a normalized format;

storing the converted information in a knowledge base;

forming patterns for the respective insiders from the information stored in the knowledge base; and comparing the patterns for the respective insiders and detecting an abnormal insider, wherein the collecting of the information includes collecting behaviors of the insiders, events related to the insiders, and state information of the insiders.

6. The insider threat detection method of claim 5, wherein the collecting of the information includes collecting information related to the insiders, including building access records, host connection records, important document access and output records, mobile storage medium use records, asset take-out records, dangerous site connection records, database connection records of the insiders, and network traffic of IT equipments owned by the insiders.

7. The insider threat detection method of claim 5, wherein the converting of the collected information includes converting the collected information into a normalized format including a 4W1H (who, when, where, what, and how) paradigm.

8. The insider threat detection method of claim 5, wherein the forming of the patterns includes separating the information stored in the knowledge base into a higher frequency and a lower frequency than a predetermined reference value through wavelet transform and analyzing the frequency of abnormal conditions for each insider at the higher frequency.

9. The insider threat detection method of claim 8, wherein the comparing of the patterns includes measuring the similarity between the patterns of the abnormal conditions for the respective insiders, generated in the forming of the patterns, using an Euclidean distance, clustering insiders exhibiting a similar behavior pattern using the measured similarity, finding out a cluster to which an insider having a different position belongs, to which an insider performing a different duty belongs, or to which only a small number of insiders belong, and detecting an abnormal insider.

* * * * *